Patented Oct. 27, 1925.

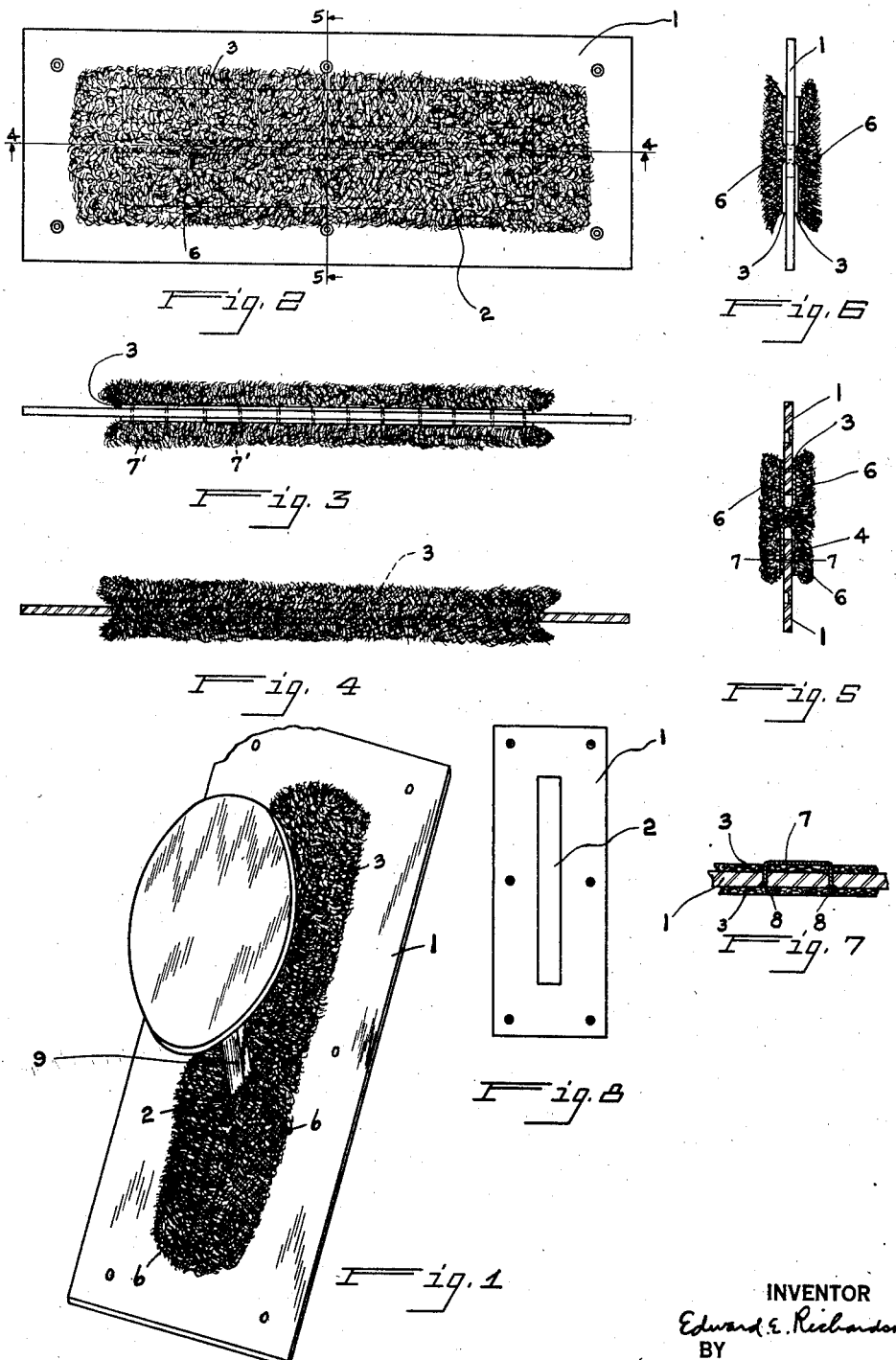

1,558,761

UNITED STATES PATENT OFFICE.

EDWARD E. RICHARDSON, OF MAUMEE, OHIO.

DRAFT-PREVENTING MAT.

Application filed December 11, 1924. Serial No. 755,187.

*To all whom it may concern:*

Be it known that I, EDWARD E. RICHARDSON, a citizen of the United States, residing at Maumee, in the county of Lucas and State of Ohio, have invented certain new and useful Improvements in Draft-Preventing Mats, of which the following is a specification.

My invention relates to draft preventing mats and aims as one of its objects to prevent a draft of air or other gas passing through the slot at the same time permitting the reciprocation of a mechanism controlling lever, shaft or rod lengthwise of the slot.

My device will prevent the draft of cold or hot air from the forward portion of an automobile which is exposed to the weather and the temperature from the engine coming through the slots necessarily provided in the floor board of the automobile and through which slots the controlling pedals of the automobile are adapted to be moved.

I further aim to provide an efficient form of draft preventing mat which can be inexpensively manufactured and which will be efficient in use and will prevent a draft of air from flowing through the slot provided in the floor board and through which an automobile controlling pedal such as a brake or clutch pedal may be moved.

Other objects of my invention, and the invention itself will become apparent as the description of a specific embodiment thereof progresses and in which description reference will be had to the accompanying drawing forming a part of this specification.

Referring to the drawing—

Fig. 1 shows a perspective view of an embodiment of my invention in place as on the floor board of an automobile, and enclosing the shank of an automobile controlling pedal such as a brake or clutch pedal.

Fig. 2 shows a plan view of the mat of Fig. 1;

Fig. 3 shows a side elevational view of the mat of Figs. 1 and 2;

Fig. 4 shows a longitudinal medial sectional view taken on the line 4—4 of Fig. 2;

Fig. 5 shows a transverse sectional view taken on the line 5—5 of Fig. 2;

Fig. 6 shows an end elevational view of the mat of Fig. 2;

Fig. 7 shows a sectional view taken on the line 7—7 of Fig. 5 showing the fastening means whereby portions of the mat are secured together; and Fig. 8 shows a reduced plan view of the rubber support.

Referring now to all of the figures in which like parts are designated by like reference characters, at 1, I show the body portion of the mat which may be composed of any suitable material, but which I prefer to make of rubber. The body portion is of any suitable form but which I herein show as rectangular. At 2 I show an opening through the sheet material of the mat 1, this opening being a relatively narrow elongated slot indicated by dotted lines in Figs. 2 and 4 and indicated by the space between the two portions of the drawing of Fig. 5.

At 3 and 4 I show fibrous material which is densely matted and which extends into the slot from each side thereof. The fibres overlap closing the slot against the passage of air or the like, but which permits the free passage of the pedal shaft. In the embodiment shown I have employed wool which is still upon the hide. The hides are cut into strips. These strips of hide 3 and 4 are folded so as to fit over the two edges of the mat 1 with the wool 6 extending on the external surfaces of the folded hide and the inner faces of the folded hide engaging tightly against the top and bottom faces of the mat material 1 along the border of the slot 2. The wool fibres overlap thus barring the passage of air and other gases, dirt, dust, etc. I then secure the folded-over hide portions 3 and 4 to the rubber material 1 of the mat by suitable means such as metal pins or brads 7 driven through the hide portion 3 or 4, as the case may be, and the sheet of intermediate rubber 1, these pins having their ends 8 bent over so as to clinch the pins in place.

When such a facing comprising the hide portions 3 and 4 and the wool extending exteriorly in all directions is secured in place by means of such pins 7, or by means of pins 7¹ of a slightly different form wherein the ends are bent over so as to meet and make a completely closed rectangular ring of wire, the wool 6 will extend from the top and bottom faces of the mat as is best illustrated in Figs. 1, 3, 4, 5 and 6 and in the other figures exclusive of Fig. 7 and the wool of the two hide portions 3 and 4 which are thus forced together, will by the natural resiliency of the wool itself, press against each other, the pressure being maintained at all times so as to keep the slot closed against the ingress of a draft past the pedal shank 9 and when the pedal shank 9 is moved in either direction through the slot 2, the wool will engage the exterior sides of the shank snugly and will close the opening which otherwise would follow in the wake of the moving shank.

While I have described herein and shown only a single embodiment of my invention, I am aware that numerous and extensive departures may be made from the embodiment herein illustrated and described, but without departing from the spirit thereof.

While the slot is broad enough to permit the movement therein of the pedal shaft, the slot is narrow relative to the fibres. In its to and fro movement, the pedal shaft stirs the fibres extending into, over and under the slot, thus combating any tendency of the fibres to pack. As will be seen in the embodiment shown, fibres project into the slot not only from the portions of the hide attached to the edges of the slot, but from the portions of the hide mounted on the flat parts of the mat adjacent the slot, consequently the mass of fibres opposing the entrance of cold air, dust, etc. is much thicker than the mat proper as shown in Figs. 3, 4, 5 and 6.

I claim:

1. In a slot-closing mat of the class described, a flat sheet base having a slot opening therethrough, a facing for portions of the base adjacent the slot and the edges of the slot comprising hide and animal's wool fibres secured to the hide and projecting outwardly therefrom and across the slot to close the same, the resiliency of the wool fibres maintaining the slot closed.

2. In a mat of the class described, a sheet of resilient material having an elongated slot therethrough and along and with such slot an automobile pedal shank is adapted to be moved, and a facing for the surfaces of the sheet adjacent the slot opening comprising densely matted fibres secured to such surfaces.

3. In a mat of the class described, a sheet of resilient material having an elongated slot therethrough and along and in such slot an automobile pedal shank is adapted to be moved, and a facing for the surfaces of the sheet adjacent the slot opening comprising natural wool fibres and raw hide to which said fibres are naturally attached, and means to secure said raw hide to said sheet on both sides thereof, and whereby said wool projects in said slot to bar the passage of gas, dirt, etc. but to permit movement of the pedal shank.

4. In a device of the class described the combination of a flat mat of rubber or the like provided with a slot adapted to permit the free movement of an automobile pedal shaft or the like therein and therethrough, and densely matted fibres mounted on the flat part of said mat and extending into said slot to normally close the same against air currents but adapted to permit movement of the pedal shaft therethrough.

5. In a device of the class described, the combination of a flat mat of rubber or the like provided with a slot adapted to permit the free movement of an automobile pedal or the like therein and therethrough and densely matted fibres mounted on the flat part of said mat on each side of said slot and extended into said slot, the fibres mounted on one side of the slot overlapping with the fibres mounted on the other side of said slot, said fibres normally closing said slot against the passage of air currents but permitting movement of the pedal shaft therethrough.

6. In a device of the class described, the combination of a floor mat having a relatively narrow longitudinal slot therein through which may pass and in which may reciprocate an automobile pedal shaft or the like, and fibres in dense quantities mounted on the edges of said slot and on the face of said mat on either side of said slot and extending into and about said slot to close it against air, dust and the like, but to permit the movement of the pedal shaft therein.

7. In a device of the class described, the combination of a floor mat having a relatively narrow longitudinal slot therein through which may pass and in which may reciprocate an automobile pedal shaft or the like and fibres in dense quantities connected at one end to the edges of said slot and to both sides of the face of the mat adjacent the edges of said slot, said fibres being free at the other ends and extending into said slot and above and below the same and overlapping so as to close the slot against air, dust, dirt and the like, but to permit the free movement of said shaft therein.

In testimony whereof I hereunto affix my signature this 5th day of Dec., 1924.

EDWARD E. RICHARDSON.